United States Patent
He et al.

(10) Patent No.: US 12,511,063 B2
(45) Date of Patent: *Dec. 30, 2025

(54) HOST RECOVERY FOR A STUCK CONDITION

(71) Applicant: Micron Technology, Inc., Boise, ID (US)

(72) Inventors: Deping He, Boise, ID (US); Jonathan S. Parry, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/638,471

(22) Filed: Apr. 17, 2024

(65) Prior Publication Data

US 2024/0345750 A1 Oct. 17, 2024

Related U.S. Application Data

(63) Continuation of application No. 17/648,399, filed on Jan. 19, 2022, now Pat. No. 11,983,423.

(Continued)

(51) Int. Cl.
*G06F 3/06* (2006.01)
*G06F 1/3234* (2019.01)
*G06F 1/3296* (2019.01)

(52) U.S. Cl.
CPC .......... *G06F 3/0634* (2013.01); *G06F 1/3275* (2013.01); *G06F 1/3296* (2013.01);
(Continued)

(58) Field of Classification Search
CPC .... G06F 3/0634; G06F 3/0625; G06F 3/0659; G06F 3/0673; G06F 1/3275; G06F 1/3296

(Continued)

(56) References Cited

U.S. PATENT DOCUMENTS

| 9,697,065 B1 | 7/2017 | Abhishek et al. |
| 2002/0077224 A1* | 6/2002 | Slawinski ............ A63B 21/078 482/8 |

(Continued)

FOREIGN PATENT DOCUMENTS

| CN | 101981530 A | 2/2011 |
| JP | 2012-164045 A | 8/2012 |

OTHER PUBLICATIONS

European Patent Office, "European search report and Search Opinion", issued in connection with European Patent Application No. 22162051.1 dated Jul. 19, 2022 (11 pages).

(Continued)

*Primary Examiner* — Christopher B Shin
(74) *Attorney, Agent, or Firm* — Holland & Hart LLP

(57) ABSTRACT

Methods, systems, and devices for host recovery for a stuck condition of a memory system are described. The host system may transmit a first command for the memory system to transition from a first power mode to a second power mode (e.g., low-power mode). In some cases, the host system may transmit a second command for the memory system to exit the second power mode shortly after transmitting the first command. The host system may activate a timer associated with a time-out condition for exiting the second power mode and may determine that a duration indicated by the timer expires. In some examples, the host system may transmit a third command for the memory system to perform a hardware reset operation based on determining that the duration of the timer expires.

20 Claims, 4 Drawing Sheets

Related U.S. Application Data

(60) Provisional application No. 63/162,335, filed on Mar. 17, 2021.

(52) U.S. Cl.
CPC .......... *G06F 3/0625* (2013.01); *G06F 3/0659* (2013.01); *G06F 3/0673* (2013.01)

(58) Field of Classification Search
USPC ........................................................ 711/154
See application file for complete search history.

(56) References Cited

U.S. PATENT DOCUMENTS

| | | |
|---|---|---|
| 2011/0035613 A1 | 2/2011 | Rancurel et al. |
| 2012/0198113 A1* | 8/2012 | Ziarnik ................ G06F 13/24 710/267 |
| 2012/0221766 A1 | 8/2012 | Yeh et al. |
| 2013/0083611 A1 | 4/2013 | Ware et al. |
| 2013/0179629 A1 | 7/2013 | Shim et al. |
| 2017/0220413 A1* | 8/2017 | Cha ..................... G06F 3/064 |
| 2018/0088854 A1 | 3/2018 | Noh et al. |
| 2019/0042418 A1* | 2/2019 | Dutta .................. G06F 12/0868 |
| 2019/0265774 A1* | 8/2019 | Tsien ................... G06F 1/3287 |
| 2019/0384528 A1* | 12/2019 | Grosz ................... G06F 3/0611 |
| 2019/0391759 A1 | 12/2019 | Kang et al. |
| 2020/0042207 A1* | 2/2020 | Kwak ................... G06F 3/0625 |
| 2020/0201418 A1 | 6/2020 | Richter et al. |
| 2020/0371581 A1 | 11/2020 | Hureau et al. |
| 2021/0018975 A1 | 1/2021 | Liang et al. |
| 2021/0050063 A1 | 2/2021 | Patel et al. |
| 2021/0247936 A1 | 8/2021 | Grosz et al. |
| 2022/0043586 A1 | 2/2022 | Liang et al. |
| 2022/0068319 A1 | 3/2022 | Bonitz |
| 2022/0113907 A1* | 4/2022 | Kobayashi ........... G06F 3/0604 |
| 2022/0253226 A1 | 8/2022 | He et al. |
| 2022/0300061 A1 | 9/2022 | He et al. |
| 2022/0300179 A1 | 9/2022 | He et al. |
| 2022/0398024 A1 | 12/2022 | Ge |
| 2023/0041215 A1 | 2/2023 | Porzio et al. |
| 2023/0214137 A1 | 7/2023 | Palmer et al. |

OTHER PUBLICATIONS

Chinese patent office, "China Office Action," issued in connection with China Patent Application No. 202210264764.6 dated Aug. 4, 2025 (18 pages total; 9 pages Original & 9 pages machine translation).

* cited by examiner

HOST RECOVERY FOR A STUCK CONDITION

CROSS REFERENCE

The present Application for Patent is a Continuation of U.S. patent application Ser. No. 17/648,399 by He et al., entitled "HOST RECOVERY FOR A STUCK CONDITION," filed Jan. 19, 2022, which claims priority to U.S. Provisional Patent Application No. 63/162,335 by He et al., entitled "HOST RECOVERY FOR A STUCK CONDITION," filed Mar. 17, 2021, which is assigned to the assignee hereof and is expressly incorporated by reference in its entirety herein.

FIELD OF TECHNOLOGY

The following relates generally to one or more systems for memory and more specifically to host recovery for a stuck condition.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
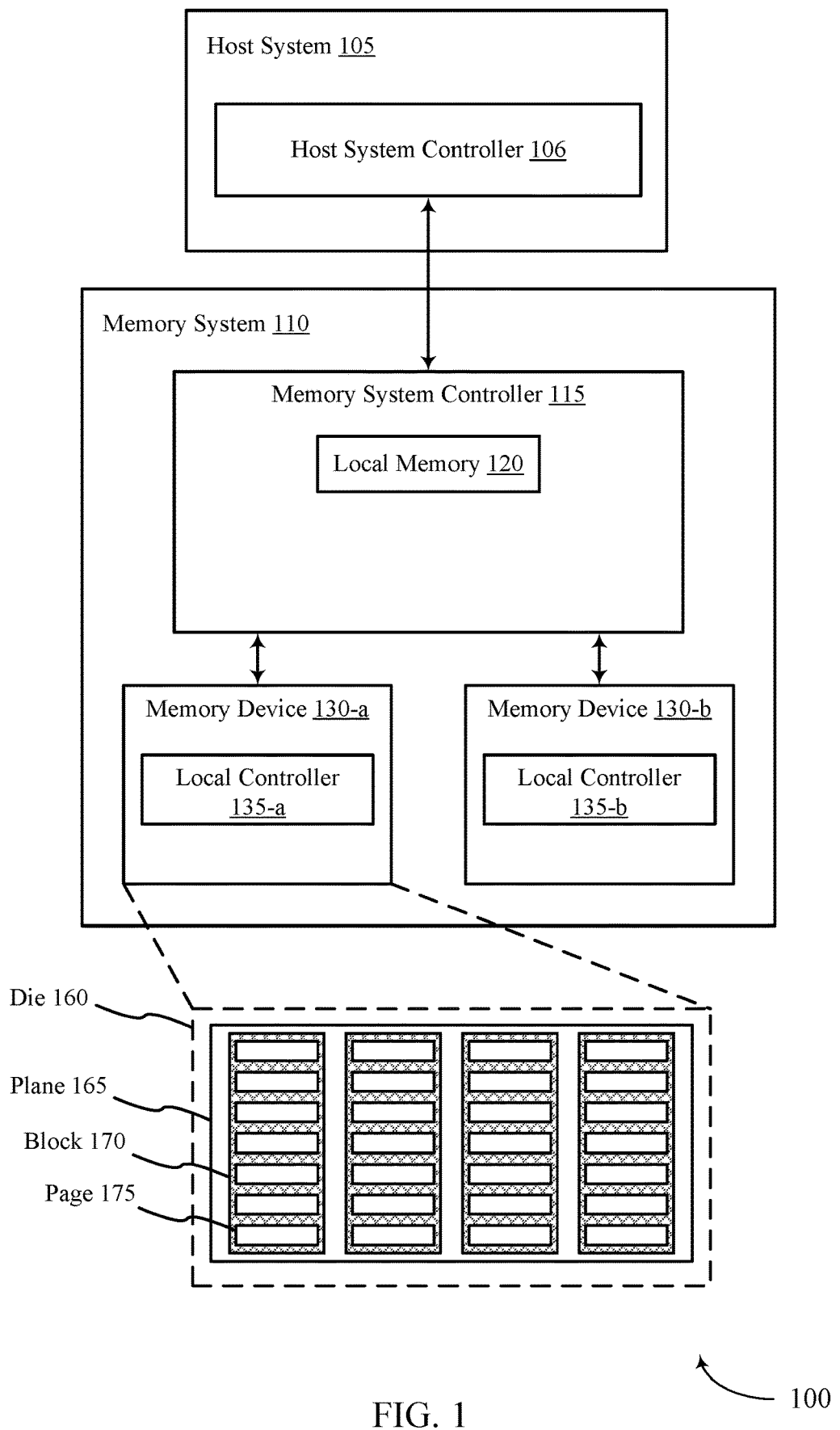
FIG. 1 illustrates an example of a system that supports host recovery for a stuck condition in accordance with examples as disclosed herein.

In some systems, the memory system may power down (e.g., enter a sleep mode), thereby conserving power and resources associated with operating the memory system. In such cases, the memory system may refrain from performing operations during a discharge time used to enter the sleep mode. The memory system may receive a request to power on (e.g., enter an active mode) during the discharge time which may interrupt the memory system as it powers down. For example, a user may double-tap a power button of device. The first press of the power button may cause the host system to enter a sleep mode and the second press of the power button may cause the host system to exit the sleep mode. The double-tapping of the power button may cause memory system to try to exit the sleep mode before the discharge time is complete. The memory system may experience a stuck condition if the memory system fails to fully power down (e.g., enter the sleep mode) before being moved back into a higher-power mode (e.g., the active mode) in response to receiving the request to power on. In such cases, if the memory system receives a request to power on before the discharge time expires (e.g., receives the request during a duration of the discharge time), the memory system may experience increased latency for performing operations, which may cause the memory system to experience a performance drop.

An interruption to the memory system during a power down cycle (e.g., entering the sleep mode) may cause the memory system to experience a stuck condition in which the memory system may be unable to transmit commands, receive command, or perform operations. If the memory system is interrupted during the power down cycle, a voltage of the memory system may fail to satisfy a voltage threshold condition. For example, the voltage of the memory system may be greater than 100 mV, thereby indicating that the memory system failed to fully power down during the discharge time. In such cases, the memory system may be unable to perform operations associated with the memory system, thereby increasing the latency for other operations related to the host system and decreased read, write, and erase speeds and efficiency. In some cases, the host system may cause the memory system to experience a power cycle to resolve the stuck condition. A power cycle may take a longer duration, however. Thus, techniques for detecting a stuck condition and reducing a latency to resolve the stuck condition may be desirable.

Systems, devices, and techniques are described for performing a recovery procedure for a stuck condition. In some cases, the host system may transmit a command to enter a sleep mode. The host system may isolate the memory system from a voltage supply and then connect the memory system to the voltage supply in direct response to receiving input from a user device to turn the memory system off and on, respectively. The host system may transmit a command to enter an active mode after connecting the memory system to the voltage supply. In some cases, the host system may detect that the memory system fails to wake up (e.g., enter the active mode) in response to transmitting the command to enter the active mode. In such cases, the host system may activate a timer and determine that a duration of the timer expires prior to receiving an indication that the memory system is in the active mode, thereby indicating that the memory system may be experiencing a stuck condition. The host system may transmit a command to perform a hardware reset operation (e.g., recovery operation) in direct response to determining that the duration of the timer expires. The hardware reset operation may be different than a power cycle operation.

The memory system may recover from the stuck condition by receiving the command to perform the hardware reset operation and performing the hardware reset operation. The host system may receive a response, from the memory system, after transmitting the command to perform the hardware reset operation and indicating that the memory system is available to perform operations. The host system may transmit command to perform access operations such as read operations and write operations. Such techniques may increase the overall performance of the memory system, thereby decreasing the latency for other operations related to the memory system. Transmitting a command to perform the hardware reset operation in direct response to detecting the stuck condition may improve the overall efficiency of the memory system, which may result in the memory system experiencing improved read, write, and erase speeds, reduced power consumption, improved processing times, and the like.

Features of the disclosure are initially described in the context of a system with reference to FIG. 1. Features of the disclosure are described in the context of a flow diagram with reference to FIG. 2. These and other features of the disclosure are further illustrated by and described in the context of an apparatus diagram and a flowchart that relate to host recovery for a stuck condition with reference to FIGS. 3-4.

FIG. 1 illustrates an example of a system 100 that supports host recovery for a stuck condition in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof.

Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support host recovery for a stuck condition. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system. Additionally, or alternatively, the memory system 110 may include non-volatile memory.

The host system 105 may perform a recovery operation for a stuck condition. For example, the host system 105 may transmit, to the memory system 110, a command to transition from an active mode (e.g., first power mode) to a sleep mode (e.g., second power mode). In such cases, the memory system 110 may enter the sleep mode, and the host system 105 may transmit, to the memory system 110, a command to exit the sleep mode and enter the active mode. The host system 105 may detect a time-out condition after exiting the sleep mode. For example, the host system 105 may activate a timer associated with the time-out condition in response to transmitting the command to exit the sleep mode. The host system 105 may determine that a duration indicated by the timer expires. In such cases, the host system 105 may transmit, to the memory system 110, a command to perform a hardware reset. The hardware reset operation may be configured to perform the recovery operation for the stuck condition, thereby allowing the memory system to experience improved read, write, and erase speeds, reduced power consumption, and improved processing times. The hardware reset operation may be different than a power cycle operation.

Figure 2:
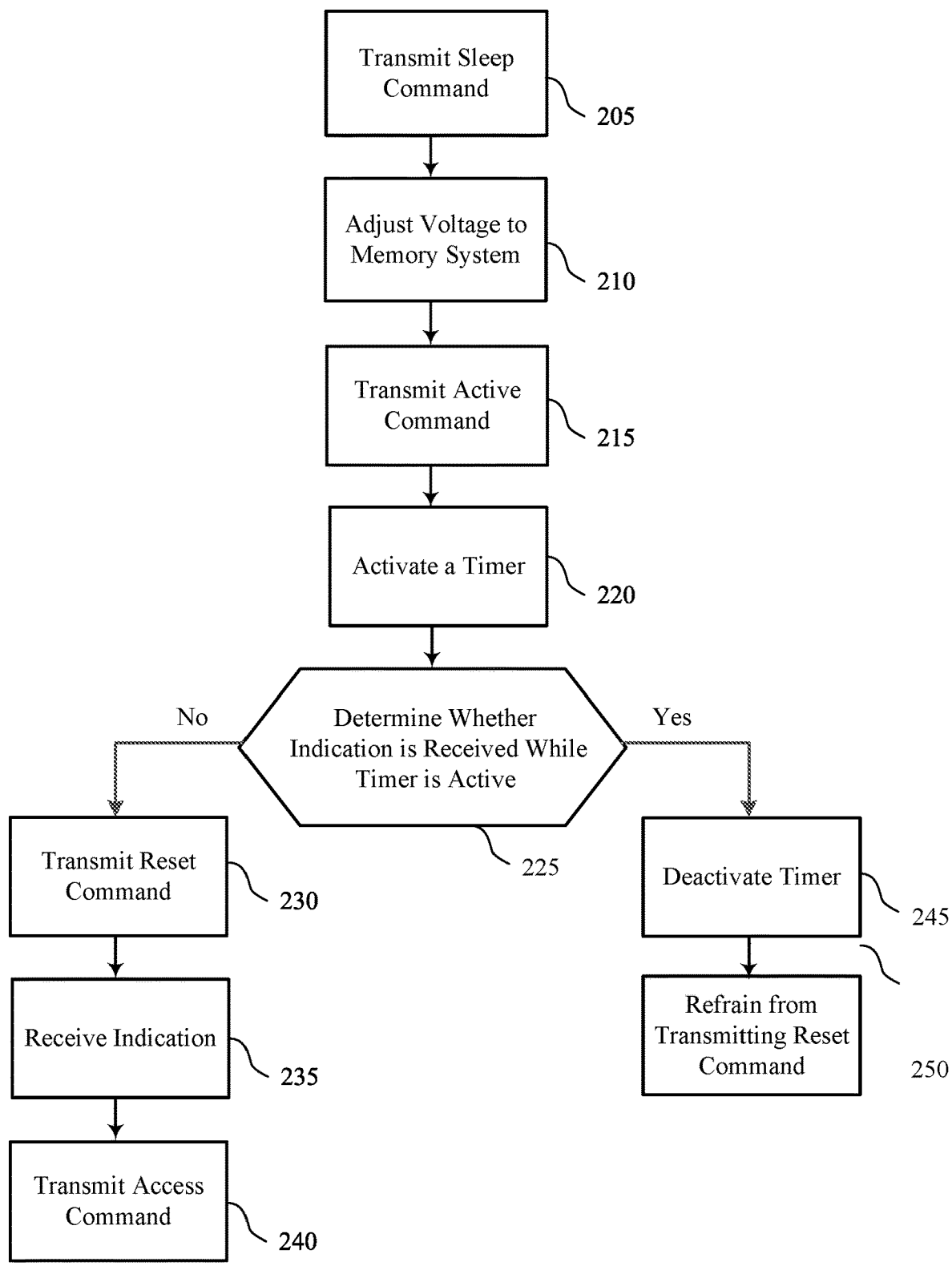
FIG. 2 illustrates an example of a flow diagram that supports host recovery for a stuck condition in accordance with examples as disclosed herein.

FIG. 2 illustrates an example of a flow diagram 200 that supports host recovery for a stuck condition in accordance with examples as disclosed herein. The operations of flow diagram 200 may be implemented by any device or its components as described herein. For example, the operations of flow diagram 200 may be performed by a host system as described with reference to FIG. 1. Alternative examples of the following may be implemented, where some steps are performed in a different order or not at all. Some steps may additionally include additional features not mentioned below. The flow diagram 200 illustrates techniques where a host system may perform a recovery operation for a stuck condition.

Aspects of the flow diagram 200 may be implemented by a controller, among other components. Additionally or alternatively, aspects of the flow diagram 200 may be implemented as instructions stored in a controller (e.g., controller coupled with the host system). For example, the instructions, when executed by a controller (e.g., the host system controller 106), may cause the controller to perform the operations of the flow diagram 200.

In some systems, a user may double-tap the power button on the user device (e.g., including the memory system) which may power down and power on the memory system within a limited duration of time. In such cases, the memory system may be interrupted as the memory system is powering down (e.g., entering a sleep mode) based on the user device receiving the second tap to power on the memory system. If the memory system is interrupted during a power down cycle, the memory system may experience a stuck condition in which the memory system may be unable to transmit commands, receive commands, or perform operations. In such cases, the memory system may perform a power cycle to reset the memory system, thereby causing increased latency for performing operations. The stuck condition may occur if the voltage associated with the memory system may fail to satisfy a threshold to initialize the memory system, thereby indicating that the memory system failed to enter sleep mode (e.g., fully power down).

The stuck condition may occur if the memory system fails to fully power down before being moved back into a higher-power mode (e.g., powered on). For example, a user of a mobile device may press a button to cause the mobile device to power down, but then immediately process the button to power on (e.g., wake up) the mobile device. In some cases, if the memory system does not have enough time to fully power down, the memory system may fail to reinitialize upon powering on. Performing a power cycle to address the stuck condition may increase a wake-up time associated with the memory system that may increase the wake-up time from a few milliseconds to hundreds of milliseconds. Techniques may be described for a host system to detect a time-out condition after sending an active command. If a time-out condition is detected, the host system may transmit a command to perform a hardware reset operation using a write protect pin.

At 205, a sleep command may be transmitted. For example, the host system may transmit, to a memory system, a first command, to transition from a first power mode to a second power mode. The first command may be an example of a sleep command, an idle command, a power down command, a low power mode command, a power off command, or a combination thereof. The first power mode may be an example of an active mode, an awake mode, a power on mode, or a combination thereof. In some examples, the first power mode may be associated with executing received commands. The second power mode may be an example of a sleep mode, an idle mode, a power down mode, a low power mode, a power off mode, or a combination thereof. In some cases, the second power mode may be associated with deactivating one or more components associated with the memory system. In such cases, the second power mode may consume less energy of the memory system than the first power mode. The host system may transmit the command in response to a user pressing the power button off on a user device that includes the memory system. The memory system may receive the command and enter the second power mode (e.g., power down) in direct response to receiving the command. The first command may be an example of a self-service user (SSU) command.

At 210, a voltage may be adjusted to the memory system. For example, the host system may isolate the memory system from a voltage associated with at least one power supply of the memory system in response to transmitting the first command. In such cases, the host system may turn off the voltage (e.g., VCC) associated with the at least one power supply. In some cases, the user device associated with the memory system may receive an indication to turn off. For example, the user may press the power button off on the user device that includes the memory system. The memory system may receive the indication, and the host system may isolate the memory system from the voltage.

In some cases, the user device associated with the memory system may receive an indication to turn on. For example, the user may press the power button on the user device that includes the memory system. The memory system may receive the indication, and the host system may connect the memory system to the voltage associated with at least one power supply associated with the memory system. In such cases, the host system may turn on the memory system during a power down cycle, thereby interrupting operations of the memory system to prepare for a sleep mode and introducing the stuck condition. In some cases, turning on and off the voltage (e.g., VCC) during the sleep mode may conserve power associated with the memory system and increase the efficiency of the memory system.

At 215, an active command may be transmitted. For example, the host system may transmit a second command for the memory system to exit the second power mode in response to connecting the memory system to the voltage. The second command may be an example of an active command, an awake command, a power on command, or a combination thereof. The host system may transmit a command for the memory system to enter the first power mode. In such cases, the memory system may enter the first power mode (e.g., active mode). In some cases, transmitting the second command may be based on transmitting the first command and/or isolating the memory system from the voltage. The second command may be an example of the SSU command.

At 220, a timer may be activated. For example, the host system may activate a timer associated with a time-out condition for exiting the second power mode in response to transmitting the second command. The host system may detect a time-out condition and start a timer after sending the second command. The time-out condition may be an example of a duration of time that the host system may look for a message from the memory system after the host system transmits the second command. In some examples, the host system may notify the memory system of the shutter time frame (e.g., duration of the timer). The host system may send a command to activate (e.g., start the timer). The time-out condition may be a specified period of time that may be allowed to elapse in the memory system before a specified event (e.g., a hardware reset operation) takes place.

At 225, a determination may be made whether an indication is received while the timer is active. For example, the host system may determine whether the timer expires. In some cases, the host system may determine whether a timer expires and may determine whether an indication has been received based on the expiration of the timer. In some examples, the host system may determine that a duration indicated by the timer expires after activating the timer. In other examples, the host system may determine that the duration indicated by the timer fails to expire after activating the timer. In some cases, determining whether the time expires may be an example of determining whether the time-out condition occurs.

At 225, the host system may determine that an indication may not be received while the timer is active. In response to determining that the duration indicated by the timer expires, the host system may not receive a message (e.g., indication) from the memory system indicating that the memory system may be ready to receive a command (e.g., access command). For example, the memory system may refrain from transmitting, to the host system, the message during the duration of the timer. In such cases, the timer may expire if the message from the memory system is not received at the host system within the duration indicated by the timer. In some cases, the determination that the duration indicated by the timer expires may be an example of the indication received at the host system. For example, the duration of the timer expiring may be an example of an indication. The duration indicated by the timer may be predetermined based on activating the timer (e.g., may be set by a trim parameter or other operational parameter stored by the memory system). For example, the host system may activate the timer and indicate a ten minute duration. In such cases, if the host system does not receive an indication from the memory system within ten minutes, the timer may expire.

In some cases, at 225, the host system may determine that a voltage associated with at least one voltage supply of the memory system satisfies a threshold based on determining that the duration indicated by the timer expires. For example, the host system may determine whether a voltage of the memory cell associated with the memory system is below 0.5 volts in response to determining that the timer expires. If the voltage of the memory cell associated with the memory system is below 0.5 volts, the memory system may be determined to fully power down. If the voltage of the memory cell associated with the memory system is above 0.5 volts, the memory system may be determined to not fully power down, thereby indicating that a stuck condition may occur.

At 225, the host system may determine that the memory system received the second command during a second duration used to transition from the first power mode to the second power mode. For example, the host system may determine that the memory system wakes up (e.g., enters the first power mode) and does not fully power down during a discharge time. The discharge time may be an example of a duration of time to enter the second power mode. For example, the discharge time may be 100 milliseconds (ms).

At 230, a reset command may be transmitted. The reset command may be transmitted based on determining that the indication is not received while the timer is active. For example, the host system may transmit a third command for the memory system to perform a hardware reset operation in response to determining that the duration of the timer expires. In such cases, the host system may issue the hardware reset operation after detecting the timeout condition and determining that the timer expires. The memory system may receive the third command and perform the hardware reset operation in response to receiving the third command. In some cases, issuing the hardware reset operation may be based on determining that the voltage satisfies the threshold (e.g., the voltage is above 0.5 volts). In other examples, issuing the hardware reset operation may be based on determining that the memory system received the second command during the second duration (e.g., the memory system wakes up within 100 milliseconds after receiving the first command).

In some examples, the host system may activate a write protect pin associated with the memory system in direct response to determining that the duration indicated by the timer expires. For example, the host system may activate the write protect pin as part of the hardware reset operation. In such cases, the memory system may perform the hardware reset operation using write protect pin and in response to activating the write protect pin. For example, the hardware reset operation may use a pin as a NAND hardware reset.

The hardware reset operation may reset one or more memory dies associated with the write protect pin that is maintained at a voltage lower than a threshold voltage. In such cases, the hardware reset operation may be triggered by bringing the write protect pin to a low voltage (e.g., a voltage below a threshold). The hardware reset operation may be different than a power cycle. The power cycle may include isolating the memory system from one or more voltages supplies and reinitializing one or more operating parameters of the memory system. The power cycle may cause the entire memory system and components of the memory system to enter an initial power-on state. The power cycle may cause the memory system to reload parameters (e.g., trim parameters or operation parameters) from the non-volatile memory device into the volatile memory devices used to operate the memory system (e.g., caches, buffers, and SRAMs). The power cycle causes the memory system to transition to a power on state. The hardware reset operation may initialize fewer parameters than the power cycle operation.

The hardware reset operation may be used to put a target region of the memory system into a known condition like that of a power-on initialized state. The hardware reset operation may provide a way to recover the NAND device (e.g., memory device) of the memory system if the memory system becomes unresponsive during a stuck condition. The hardware reset operation may be triggered by reducing a voltage of the write protect pin to a voltage lower than a voltage threshold for the duration of the hardware reset operation. The hardware reset operation may reset each memory die of the memory system that is coupled with an access line that transmits the write protect signal where the signal is below the voltage threshold.

Performing a hardware reset operation in response to determining that the timer expires (e.g., that a time-out condition occurs) may prevent the memory system from recycling power to the memory system and performing a full power cycle, thereby decreasing the latency for performing operations and decreasing the start-up time to perform operations. The hardware reset operation may address (e.g., dismiss) the stuck condition such that the host system may connect the memory system to the voltage associated with at least one power supply associated with the memory system.

At 235, an indication may be received. For example, the host system may receive, from the memory system, an indication after the duration indicated by the timer expires. The indication may be received in response to issuing the hardware reset operation. In such cases the host system may receive a message from the memory system indicating that the memory system may be ready to receive a command (e.g., access command). The indication may be an example of an SSU response.

At 240, an access command may be transmitted. For example, the host system may transmit a command to perform an access operation in response to receiving the indication. The access command may be an example of a read command or a write command. In such cases, the memory system may receive the access command and perform the access operation. The access operation may be an example of a read operation or a write operation.

In other examples, at 225, the host system may determine that the indication is received while the timer is active. For example, the host system may determine that the duration indicated by the timer fails to expire based on activating the timer. For example, the host system may receive an indication from the memory system that the memory system may be ready to receive a command (e.g., access command) before the timer expires. The host system may look for an indication (e.g., message) from the memory system before the duration indicated by the timer expires.

For example, prior to receiving the indication, the host system may transmit a fourth command for the memory system to transition from the first power mode to the second power mode. The fourth command may be an example of a sleep command, an idle command, a power down command, a low power mode command, a power off command, or a combination thereof. The first power mode may be an example of an active mode, an awake mode, a power on mode, or a combination thereof. In some examples, the first power mode may be associated with executing received commands. The second power mode may be an example of a sleep mode, an idle mode, a power down mode, a low power mode, a power off mode, or a combination thereof. In some cases, the second power mode may be associated with deactivating one or more components associated with the memory system. In such cases, the second power mode may consume less energy of the memory system than the first power mode.

The host system may then transmit a fifth command for the memory system to exit the second power mode based on transmitting the fourth command. The fifth command may be an example of an active command, an awake command, a power on command, or a combination thereof. The host system may transmit a command for the memory system to enter the first power mode. In such cases, the memory system may enter the first power mode (e.g., power on). In some cases, the host system may receive, from the memory system, the indication during the duration indicated by the timer based on transmitting the fifth command to exit the second power mode.

At 245, the memory system may deactivate the timer before the duration indicated by the timer expires in response to receiving the indication. In such cases, if the host system receives the indication prior to the timer expiring, the host system may cancel the timer.

At 250, a reset command may not be transmitted. For example, the host system may refrain from transmitting the third command for the memory system to perform a hardware reset operation. In some cases, refraining from transmitting the third command may be in direct response to deactivating the timer. In some cases, the host system may transmit an access command to the memory system after receiving the indication 250, similar to what is described with reference to the features described with reference to 240 and 245.

Figure 3:
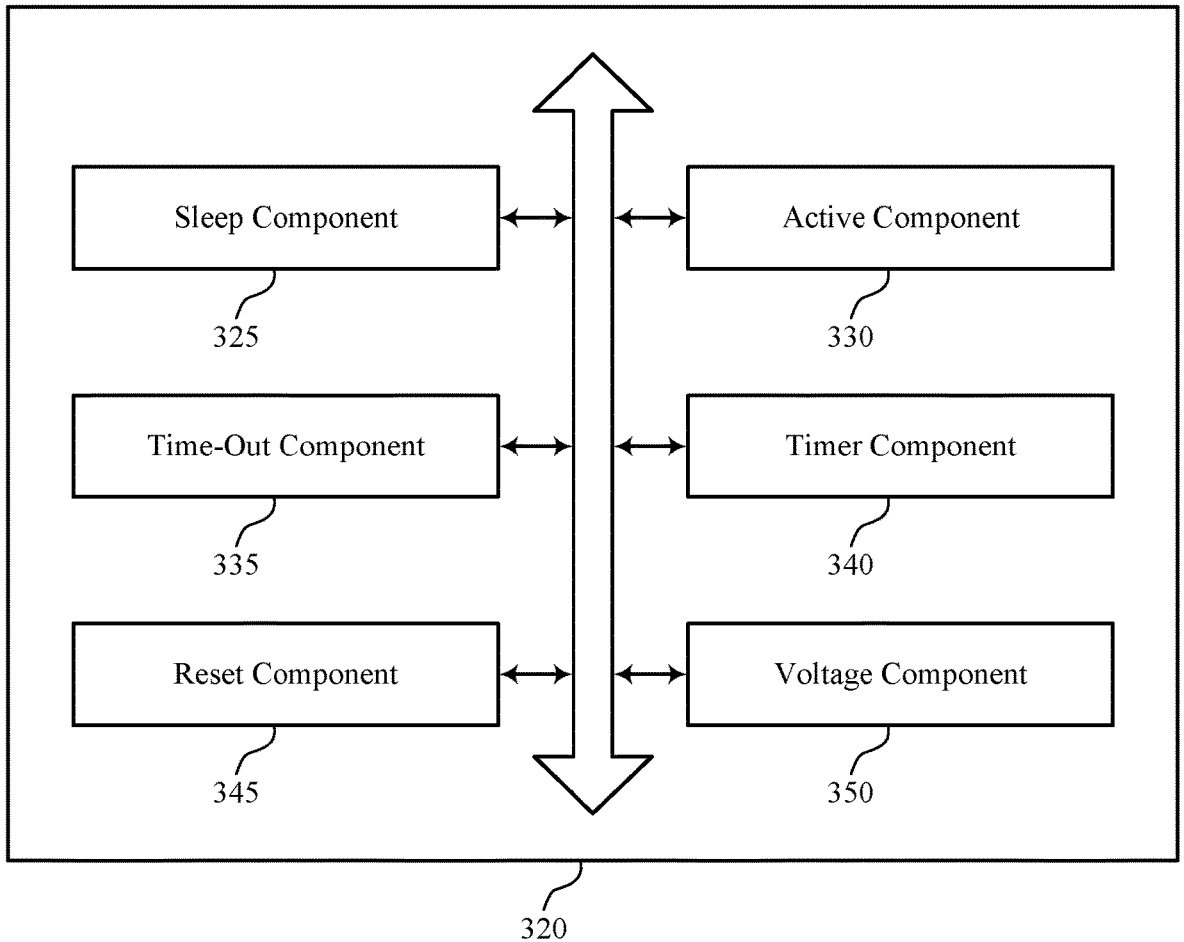
FIG. 3 shows a block diagram of a host system that supports host recovery for a stuck condition in accordance with examples as disclosed herein.

FIG. 3 shows a block diagram 300 of a host system 320 that supports host recovery for a stuck condition in accordance with examples as disclosed herein. The host system 320 may be an example of aspects of a host system as described with reference to FIGS. 1 through 2. The host system 320, or various components thereof, may be an example of means for performing various aspects of host recovery for a stuck condition as described herein. For example, the host system 320 may include a sleep component 325, an active component 330, a time-out component 335, a timer component 340, a reset component 345, a voltage component 350, or any combination thereof. Each of these components may communicate, directly or indirectly, with one another (e.g., via one or more buses).

The sleep component 325 may be configured as or otherwise support a means for transmitting a first command for a memory system to transition from a first power mode to a second power mode, the first power mode associated with executing received commands and the second power mode associated with deactivating one or more components associated with the memory system. The active component 330 may be configured as or otherwise support a means for transmitting a second command for the memory system to exit the second power mode based at least in part on transmitting the first command. The time-out component 335 may be configured as or otherwise support a means for activating a timer associated with a time-out condition for exiting the second power mode based at least in part on transmitting the second command to exit the second power mode. The timer component 340 may be configured as or otherwise support a means for determining that a duration indicated by the timer expires based at least in part on activating the timer. The reset component 345 may be configured as or otherwise support a means for transmitting a third command for the memory system to perform a hardware reset operation based at least in part on determining that the duration of the timer expires.

In some examples, the reset component 345 may be configured as or otherwise support a means for receiving, from the memory system, an indication after the duration indicated by the timer expires based at least in part on issuing the hardware reset operation. In some examples, the active component 330 may be configured as or otherwise support a means for transmitting a command to perform an access operation based at least in part on receiving the indication.

In some examples, the voltage component 350 may be configured as or otherwise support a means for determining that a voltage associated with at least one voltage supply of the memory system satisfies a threshold based at least in part on determining that the duration indicated by the timer expires, where issuing the hardware reset operation is based at least in part on determining that the voltage satisfies the threshold.

In some examples, the active component 330 may be configured as or otherwise support a means for determining that the memory system received the second command during a second duration used to transition from the first power mode to the second power mode, where issuing the hardware reset operation is based at least in part on determining that the memory system received the second command during the second duration.

In some examples, the sleep component 325 may be configured as or otherwise support a means for transmitting a fourth command for the memory system to transition from the first power mode to the second power mode. In some examples, the active component 330 may be configured as or otherwise support a means for transmitting a fifth command for the memory system to exit the second power mode based at least in part on transmitting the fourth command. In some examples, the time-out component 335 may be configured as or otherwise support a means for receiving, from the memory system, an indication during the duration indicated by the timer based at least in part on transmitting the fifth command to exit the second power mode. In some examples, the timer component 340 may be configured as or otherwise support a means for deactivating the timer before the duration indicated by the timer expires based at least in part on receiving the indication, where refraining from transmitting the third command is based at least in part on deactivating the timer.

In some examples, the reset component 345 may be configured as or otherwise support a means for activating a write protect pin associated with the memory system based at least in part on determining that the duration indicated by the timer expires.

In some examples, the voltage component 350 may be configured as or otherwise support a means for isolating the memory system from a voltage associated with at least one power supply of the memory system based at least in part on transmitting the first command, where transmitting the second command is based at least in part on isolating the memory system from the voltage.

In some examples, the voltage component 350 may be configured as or otherwise support a means for connecting the memory system to a voltage associated with at least one power supply associated with the memory system based at least in part on transmitting the first command, where transmitting the second command is based at least in part on connecting the memory system to the voltage.

In some examples, the hardware reset operation resets one or more memory dies associated with a write protect pin that is maintained at a voltage lower than a threshold voltage.

In some examples, the hardware reset operation is different than a power cycle that includes isolating the memory system from one or more voltages supplies and reinitializing one or more operating parameters of the memory system.

Figure 4:
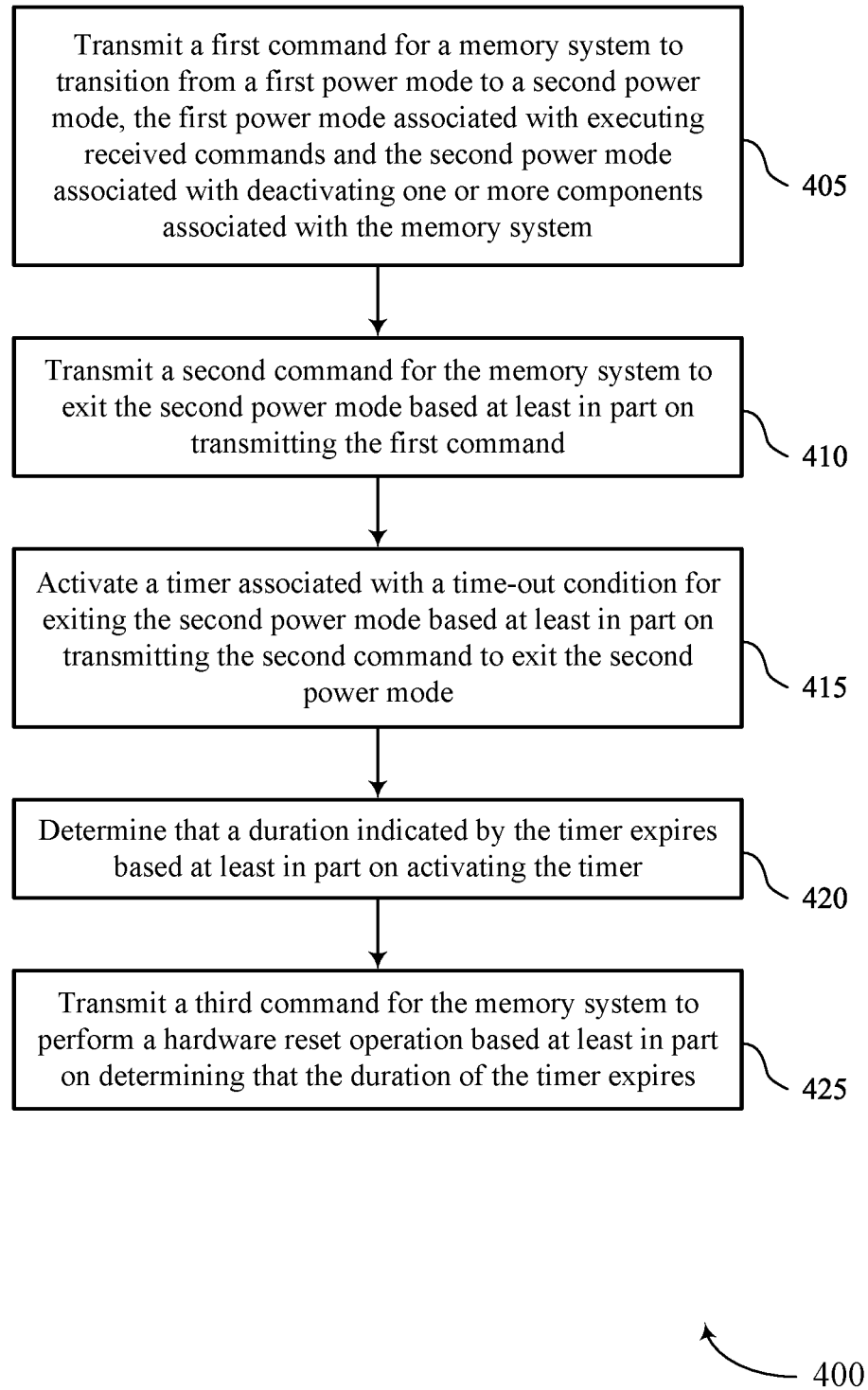
FIG. 4 shows a flowchart illustrating a method or methods that support host recovery for a stuck condition in accordance with examples as disclosed herein.

FIG. 4 shows a flowchart illustrating a method 400 that supports host recovery for a stuck condition in accordance with examples as disclosed herein. The operations of method 400 may be implemented by a host system or its components as described herein. For example, the operations of method 400 may be performed by a host system as described with reference to FIGS. 1 through 3. In some examples, a host system may execute a set of instructions to control the functional elements of the device to perform the described functions. Additionally or alternatively, the host system may perform aspects of the described functions using special-purpose hardware.

At 405, a first command may be transmitted. For example, the method may include transmitting a first command for a memory system to transition from a first power mode to a second power mode, the first power mode associated with executing received commands and the second power mode associated with deactivating one or more components associated with the memory system. The operations of 405 may be performed in accordance with examples as disclosed herein. In some examples, aspects of the operations of 405 may be performed by a sleep component 325 as described with reference to FIG. 3.

At 410, a second command may be transmitted. For example, the method may include transmitting a second command for the memory system to exit the second power mode based at least in part on transmitting the first command. The operations of 410 may be performed in accordance with examples as disclosed herein. In some examples, aspects of the operations of 410 may be performed by an active component 330 as described with reference to FIG. 3.

At 415, a timer may be activated. For example, the method may include activating a timer associated with a time-out condition for exiting the second power mode based at least in part on transmitting the second command to exit the second power mode. The operations of 415 may be performed in accordance with examples as disclosed herein. In some examples, aspects of the operations of 415 may be performed by a time-out component 335 as described with reference to FIG. 3.

At 420, a duration may be determined. For example, the method may include determining that a duration indicated by the timer expires based at least in part on activating the timer. The operations of 420 may be performed in accordance with examples as disclosed herein. In some examples, aspects of the operations of 420 may be performed by a timer component 340 as described with reference to FIG. 3.

At 425, a third command may be transmitted. For example, the method may include transmitting a third command for the memory system to perform a hardware reset operation based at least in part on determining that the duration of the timer expires. The operations of 425 may be performed in accordance with examples as disclosed herein. In some examples, aspects of the operations of 425 may be performed by a reset component 345 as described with reference to FIG. 3.

In some examples, an apparatus as described herein may perform a method or methods, such as the method 400. The apparatus may include, features, circuitry, logic, means, or instructions (e.g., a non-transitory computer-readable medium storing instructions executable by a processor) for transmitting a first command for a memory system to transition from a first power mode to a second power mode, the first power mode associated with executing received commands and the second power mode associated with deactivating one or more components associated with the memory system, transmitting a second command for the memory system to exit the second power mode based at least in part on transmitting the first command, activating a timer associated with a time-out condition for exiting the second power mode based at least in part on transmitting the second command to exit the second power mode, determining that a duration indicated by the timer expires based at least in part on activating the timer, and transmitting a third command for the memory system to perform a hardware reset operation based at least in part on determining that the duration of the timer expires.

Some examples of the method 400 and the apparatus described herein may further include operations, features, circuitry, logic, means, or instructions for receiving, from the memory system, an indication after the duration indicated by the timer expires based at least in part on issuing the hardware reset operation and transmitting a command to perform an access operation based at least in part on receiving the indication.

Some examples of the method 400 and the apparatus described herein may further include operations, features, circuitry, logic, means, or instructions for determining that a voltage associated with at least one voltage supply of the memory system satisfies a threshold based at least in part on determining that the duration indicated by the timer expires, where issuing the hardware reset operation may be based at least in part on determining that the voltage satisfies the threshold.

Some examples of the method 400 and the apparatus described herein may further include operations, features, circuitry, logic, means, or instructions for determining that the memory system received the second command during a second duration used to transition from the first power mode to the second power mode, where issuing the hardware reset operation may be based at least in part on determining that the memory system received the second command during the second duration.

Some examples of the method 400 and the apparatus described herein may further include operations, features, circuitry, logic, means, or instructions for transmitting a fourth command for the memory system to transition from the first power mode to the second power mode, transmitting a fifth command for the memory system to exit the second power mode based at least in part on transmitting the fourth command, receiving, from the memory system, an indication during the duration indicated by the timer based at least in part on transmitting the fifth command to exit the second power mode, and deactivating the timer before the duration indicated by the timer expires based at least in part on receiving the indication, where refraining from transmitting the third command may be based at least in part on deactivating the timer.

Some examples of the method 400 and the apparatus described herein may further include operations, features, circuitry, logic, means, or instructions for activating a write protect pin associated with the memory system based at least in part on determining that the duration indicated by the timer expires.

Some examples of the method 400 and the apparatus described herein may further include operations, features, circuitry, logic, means, or instructions for isolating the memory system from a voltage associated with at least one power supply of the memory system based at least in part on transmitting the first command, where transmitting the second command may be based at least in part on isolating the memory system from the voltage.

Some examples of the method 400 and the apparatus described herein may further include operations, features, circuitry, logic, means, or instructions for connecting the memory system to a voltage associated with at least one power supply associated with the memory system based at least in part on transmitting the first command, where transmitting the second command may be based at least in part on connecting the memory system to the voltage.

In some examples of the method 400 and the apparatus described herein, the hardware reset operation resets one or more memory dies associated with a write protect pin that may be maintained at a voltage lower than a threshold voltage.

In some examples of the method 400 and the apparatus described herein, the hardware reset operation may be different than a power cycle that includes isolating the memory system from one or more voltages supplies and reinitializing one or more operating parameters of the memory system.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A host system, comprising:
   processing circuitry configured to cause the host system to:
   transmit a first command for a memory system to transition from a first power mode to a second power mode;
   transmit a second command for the memory system to exit the second power mode based at least in part on transmitting the first command;
   activate, by the host system, a timer based at least in part on transmitting the second command to exit the second power mode;
   receive, at the host system, an indication during a duration that the timer is activated based at least in part on transmitting the second command to exit the second power mode; and
   deactivate the timer before the duration indicated by the timer expires based at least in part on receiving the indication.

2. The host system of claim 1, wherein the processing circuitry is further configured to cause the host system to:
   refrain from transmitting a third command to perform a hardware reset operation based at least in part on deactivating the timer.

3. The host system of claim 2, wherein the processing circuitry is further configured to cause the host system to:
   determine that the duration indicated by the timer is not expired based at least in part on receiving the indication, wherein refraining from transmitting the third command is based at least in part on determining that the duration of the timer is not expired.

4. The host system of claim 1, wherein the processing circuitry is further configured to cause the host system to:
   transmit a command to perform an access operation based at least in part on deactivating the timer.

5. The host system of claim 1, wherein the first power mode is associated with executing received commands.

6. The host system of claim 1, wherein the second power mode is associated with deactivating one or more components associated with the memory system.

7. The host system of claim 1, wherein the timer is associated with a time-out condition for exiting the second power mode.

8. The host system of claim 1, wherein the processing circuitry is further configured to cause the host system to:
isolate the memory system from a voltage associated with a power supply of the memory system based at least in part on transmitting the first command.

9. The host system of claim 1, wherein the processing circuitry is further configured to cause the host system to:
connect the memory system to a voltage associated with a power supply associated with the memory system based at least in part on transmitting the first command.

10. A memory system, comprising:
a processing circuitry configured to cause the memory system to:
receive a first command for the memory system to transition from a first power mode to a second power mode;
receive a second command for the memory system to exit the second power mode based at least in part on receiving the first command;
receive, at the memory system, a third command for the memory system to activate a timer based at least in part on receiving the second command to exit the second power mode; and
transmit, from the memory system, an indication during a duration that the timer is activated based at least in part on receiving the third command to activate the timer.

11. The memory system of claim 10, wherein the processing circuitry is further configured to cause the memory system to:
receive a command to deactivate the timer based at least in part on transmitting the indication during the duration indicated by the timer, wherein the timer is associated with a time-out condition for exiting the second power mode.

12. The memory system of claim 10, wherein the processing circuitry is further configured to cause the memory system to:
deactivate the timer before the duration indicated by the timer expires based at least in part on transmitting the indication during the duration indicated by the timer.

13. The memory system of claim 10, wherein the processing circuitry is further configured to cause the memory system to:
receive a command to perform a hardware reset operation based at least in part on transmitting the indication during the duration indicated by the timer; and
perform the hardware reset operation based at least in part on receiving the command.

14. The memory system of claim 10, wherein the processing circuitry is further configured to cause the memory system to:
receive an indication of the duration indicated by the timer based at least in part on receiving the third command.

15. The memory system of claim 10, wherein the first power mode is associated with executing received commands.

16. The memory system of claim 10, wherein the second power mode is associated with deactivating one or more components associated with the memory system.

17. A non-transitory computer-readable medium storing code comprising instructions, which when executed by a processor circuitry of an electronic device, cause the electronic device to:
transmit a first command for a memory system to transition from a first power mode to a second power mode;
transmit a second command for the memory system to exit the second power mode based at least in part on transmitting the first command;
activate, by a host system, a timer based at least in part on transmitting the second command to exit the second power mode;
receive, at the host system, an indication during a duration that the timer is activated based at least in part on transmitting the second command to exit the second power mode; and
deactivate the timer before the duration indicated by the timer expires based at least in part on receiving the indication.

18. The non-transitory computer-readable medium of claim 17, wherein the instructions, when executed by the processor circuitry of the electronic device, further cause the electronic device to:
refrain from transmitting a third command to perform a hardware reset operation based at least in part on deactivating the timer.

19. The non-transitory computer-readable medium of claim 18, wherein the instructions, when executed by the processor circuitry of the electronic device, further cause the electronic device to:
determine that the duration indicated by the timer is not expired based at least in part on receiving the indication, wherein refraining from transmitting the third command is based at least in part on determining that the duration of the timer is not expired.

20. The non-transitory computer-readable medium of claim 17, wherein the instructions, when executed by the processor circuitry of the electronic device, further cause the electronic device to:
transmit a command to perform an access operation based at least in part on deactivating the timer.

* * * * *